United States Patent [19]

Murakoshi et al.

[11] 3,781,809

[45] Dec. 25, 1973

[54] RETRIEVAL METHOD IN READING DICTIONARIES

[75] Inventors: Makoto Murakoshi; Shingo Ooue; Hiroyuki Ueda; Masakazu Hashiue; Hirotoshi Endo, all of Asaka, Japan

[73] Assignee: Fuji Photo Film Co., Ltd., Kanagawa, Japan

[22] Filed: Aug. 26, 1970

[21] Appl. No.: 66,952

[30] Foreign Application Priority Data

Aug. 27, 1969 Japan .............................. 44/67796

[52] U.S. Cl. ................................ 340/172.5, 353/27

[51] Int. Cl. ......................... G06f 15/02, G06f 15/40

[58] Field of Search .................... 340/172.5; 353/25, 353/26, 27

[56] References Cited

UNITED STATES PATENTS

| | | | |
|---|---|---|---|
| 3,612,676 | 10/1971 | Ooba et al. | 353/27 |
| 3,585,597 | 6/1971 | Holmerud | 340/172.5 |
| 3,325,786 | 6/1967 | Shashoua et al. | 340/172.5 |
| 3,242,470 | 3/1966 | Hagelbarger et al. | 340/172.5 |
| 3,662,348 | 5/1972 | Weiss | 340/172.5 |
| 3,601,808 | 8/1971 | Vlack | 340/172.5 |
| 3,585,597 | 6/1971 | Holmerud | 340/172.5 |
| 3,071,753 | 1/1963 | Fritze et al. | 340/172.5 |
| 3,191,006 | 6/1965 | Avakian | 340/172.5 |
| 3,358,270 | 12/1967 | Crew | 340/172.5 |
| 3,332,069 | 7/1967 | Joseph | 340/172.5 |
| 3,240,119 | 3/1966 | Kler | 353/25 |
| 3,244,067 | 4/1966 | Jonker | 353/27 |
| 3,345,612 | 10/1967 | Goldman | 340/172.5 |
| 3,366,928 | 1/1968 | Rice | 340/172.5 |
| 3,448,436 | 6/1969 | Machol | 340/172.5 |
| 3,484,751 | 12/1969 | Cameron | 340/172.5 |
| 3,533,085 | 10/1970 | Murphy | 340/172.5 |
| 3,564,209 | 2/1971 | Loughnane | 353/26 |

*Primary Examiner*—Gareth D. Shaw
*Attorney*—Sughrue, Rothwell, Mion, Zinn & Macpeak

[57] ABSTRACT

A method for retrieving words from a dictionary in which one word representative of each page of the dictionary is stored in a memory. A desired word is compared with the stored words and as a result of the comparison the page on which the desired word is printed is displayed on an optical display device. The representative word may be the last word on a page, an imaginary word between the last word on the page and the first word on the next page, or any other word which is representative of a page.

2 Claims, 4 Drawing Figures

Figure 1:
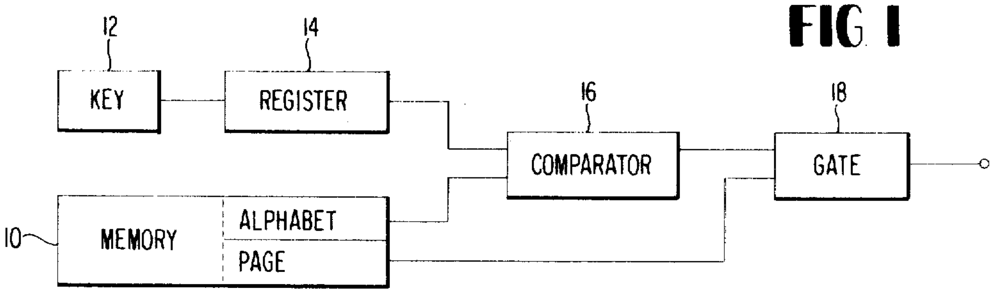

INVENTORS
MAKOTO MURAKOSHI
SHINGO OOUE
HIROYUKI UEDA
MASAKAZU HASHIUE
HIROTOSHI ENDO

BY Sughrue, Rothwell, Mion, Zinn & Macpeak
ATTORNEYS

RETRIEVAL METHOD IN READING DICTIONARIES

The present invention relates generally to a retrieval method, and particularly to a retrieval method in a reading apparatus for dictionaries in which the desired page of the dictionary is recorded on a microfilm and is selectively projected on a projection screen by striking the keys of phonetical signs in the order of the phonetical signs in the word.

The present invention is applicable to a retrieval device for retrieving the page of a dictionary or encyclopedia on which the desired word is found in a microfilm system, and more particularly to an apparatus in which the pages of a dictionary or encyclopedia recorded on a microfilm or super-microfilm are retrieved by striking phonetical sign keys in the order of the phonetical signs arranged in the word to be retrieved. Accordingly, the present invention is applicable only to the retrieval apparatus handling a book or information storage in which the words contained therein are arranged in the phonetical order as in the dictionary, encyclopedia and the like.

In general, it is very inconvenient to handle or carry thick dictionaries such as an encyclopedia, thesaurus and the like. In a library in which only one set of thesauruses is kept usually, it is inconvenient for one to consult the thesaurus while another is using it. Furthermore, the location of information is difficult for a child or someone who is not familiar with the order of the phonetical signs such as alphabetical order.

In view of the above facts, it is desirable that a novel device for easily consulting dictionaries or other thick books be developed. One of the devices of this type of dictionary reading device is a microfilm reader. In a microfilm reader, the dictionary is recorded on a sheet or roll of microfilm for the sake of convenience in handling and carrying it. It is desirable that the retrieval of the page thereof on which a desired word is contained is effected by striking the keys of phonetical signs in the order of the signs arranged in the word. If the desired word in the thick dictionary is projected on the projection screen just after the striking of the keys, much time and labor will be saved in consulting the dictionary. Furthermore, it will be easy for even a small child or someone who is not familiar with the order of the arrangement of the word therein to locate information.

In carrying out the above-described retrieval of a word or page, a difficult problem is presented. Since a great number of words are contained in a dictionary, such a great number of codes of the words should be arranged in a memory in an arrangement corresponding to the pages on which the words are contained. That is, one word-to-one page correspondence for every word should be made in the memory in the retrieval device. This requires a fairly large memory capacity, which results in high costs. It is therefore required to decrease the size of the memory in the information processor, for the memory occupies a large area of the process. It is also very important to reduce the memory size in order to shorten the access time.

In this invention, instead of all the words on one page, one representative word on one page, e.g., the last word on the page, is memorized in a memory thereby decreasing the number of the words to be memorized. In this manner, the number of the memory bits has been reduced to 0.8 percent of the memory bits required in the above-described prior art method of information processing, in the processing Kenkyusha's New English-Japanese Dictionary, which is the largest English-Japanese Dictionary in Japan. The representative word and the desired word to read are compared through a logic circuit to find the page on which the desired word is contained.

In order to compare the words in a logic circuit, the words are coded so that they may be handled by an electrical circuit. The alphabetical 26 letters are coded as follows together with a space.

| | |
|---|---|
| Space | 00000 |
| A | 00001 |
| B | 00010 |
| C | 00011 |
| D | 00100 |
| E | 00101 |
| F | 00110 |
| G | 00111 |
| H | 01000 |
| I | 01001 |
| J | 01010 |
| K | 01011 |
| L | 01100 |
| M | 01101 |
| N | 01110 |
| O | 01111 |
| P | 10000 |
| Q | 10001 |
| R | 10010 |
| S | 10011 |
| T | 10100 |
| U | 10101 |
| V | 10110 |
| W | 10111 |
| X | 11000 |
| Y | 11001 |
| Z | 11010 |

Thus, the alphabet is converted into binary code of five figures. Any code may be employed for coding the alphabet. In almost all the dictionaries, the words are arranged in the phonetical order. Such arrangement can be regarded as an orderly increase under a definite principle. There are some exceptions such as Chinese-Japanese dictionary. The present invention is applicable for all the dictionaries and encyclopedias of the type which contain words in orderly increasing order.

The principal object of the present invention is to provide a method of retrieving a word in a dictionary, and more particularly a method of retrieving a page of a dictionary on which the desired word is contained.

Another object of the present invention is to provide a method of retrieving a page of a dictionary recorded on microfilm or the like on which a desired word is contained by comparing the desired word with words representing the pages of the dictionary recorded in a memory.

Still another object of the present invention is to provide a method of retrieving a page of a dictionary on which a desired word is contained in which the page is retrieved by striking the keys of phonetical signs in the order of the arrangement of the phonetical signs in the word.

Figure 2:
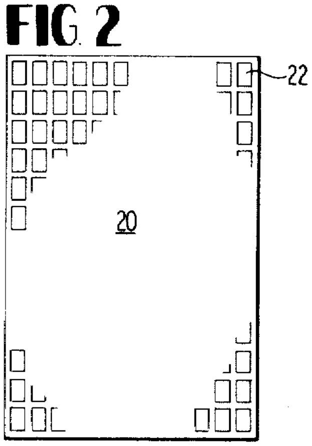
Figure 3:
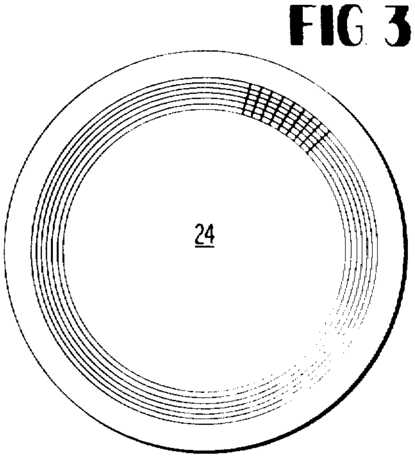
Figure 4:
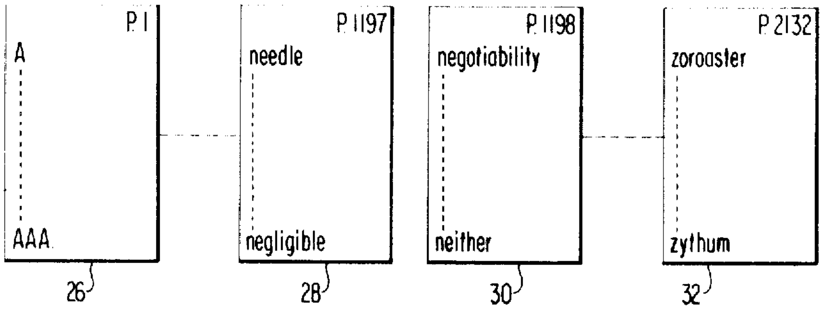

Other objects and advantages of the present invention will be made apparent from the following description taken in conjunction with the accompanying drawings in which:

FIG. 1 is a block diagram of the retrieving device for reading dictionaries employing the method of retrieving pages in accordance with the present invention, FIG. 2 is a plan view of a sheet of microfilm or microfiche on which every page of a dictionary is recorded for use in the present invention, FIG. 3 is a plan view of a film memory disc having memories for use in retrieving in the present invention, and FIG. 4 is a view explaining the logic in retrieving the page of a dictionary in accordance with the present invention.

Now referring to FIG. 1, the last word in one page is put into memory in coded form. All the last words are memorized in the memory 10 for all the pages of a dictionary in a corresponded relation with the pages. Along with the coded word, a coordinate signal of the frame of the image of the page on the microfilm is recorded. Thus, the coordinate signal of the page is recorded in the memory in relation with the code of the last word contained on the page. By striking the keys 12 in the order of the letters of the desired word, the desired word is placed in register 14 in the coded form. The registered code is compared in comparator 16 with the code of the last word memorized in the memory. Comparator 16 is conventional and may correspond to Comparator 358, illustrated in FIG. 6 of U.S. Pat. No. 3,345,612 to Goldman. When the code of the last word becomes equal to or greater than the registered word, the coordinate signal of the page is read out through gate 18 to a driving mechanism for moving the microfilm relative to an optical reading device for reading out the desired word. The driving mechanism and optical reading device is conventional and does not per se form a portion of the invention. An example of the driving mechanism and reading device which can be used with the present invention is described in U.S. Pat. No. 2,783,454 to North.

Now the present invention will be described in detail with reference to a preferred embodiment thereof.

Kenkyusha's New English-Japanese Dictionary including about 140,000 words on 2,132 pages was selected. One page includes 66 words on the average. An example of a microfiche 20 used for recording the pages of the dictionary in the present invention is shown in FIG. 2. The whole dictionary of 2,132 pages of Kenkyusha's New English-Japanese Dictionary was able to be recorded on a sheet of microfilm, or microfiche, of 4 in. × 6 in. size through a microphotographic system. A frame 22 of the image of a page of dictionary of the size 2.1mm × 3.0mm is projected onto a projection screen of the size 210mm × 297mm through a magnifying optical system of 100× magnification. The frames of the image of the pages are arranged on the microfiche in the arrangement of 45 rows and 48 lines. Accordingly, 2,160 frames can be recorded in the area of 94.9mm (45 × 2.1) × 144mm (48 × 3.0).

The memory disc 24 used in memory 10 of the present invention is shown in FIG. 3. The code of the word representing one page is recorded in the radial direction together with the code of the page. The code is recorded as a pattern on the disc so that the code may be read by a photoelectric cell.

Consideration must be given to the number of the phonetical signs required for retrieving the page on which a desired word is contained. If the number of the letters of the phonetical signs is too small, the probability of retrieving the correct page is reduced because many words have common initial letters and those words having the same initial letters exist over several pages. For example, where three letters are employed for retrieving, the words having "con" in the initial part are found over 28 pages of the Kenkyusha dictionary, from page 354 to 381. In this case, the reader would have to be manually operated for feeding the microfiche frame by frame. In case of retrieving the word "cony", the microfiche should be fed manually 27 times. If on the other hand the number of the letters is too large, the capacity of the memory required is larger though the probability of retrieving the right page is also increased. Also, the operator is required to strike a large number of keys which can be troublesome to the operator. If seven letters are used for selecting, the probability of requiring manual feeding is within the tolerable range of 1 percent.

In FIG. 4, the pages of the dictionary 26, 28, 30 and 32 are shown for the case of retrieving the word "neighbor". In this case, when the keys 12 are struck seven times in the order of the letters in the word, the binary code of 35 figures is memorized in the register 14 as follows:

01110001010100100111010000001101111
N E I G H B O.

In the memory 10 is recorded information for the words representing the page together with the page codes, as follows:

| | | | | | | | | |
|---|---|---|---|---|---|---|---|---|
| P. 1 | AAAϕϕϕϕ | 00001 | 00001 | 00001 | 00000 | 00000 | 00000 | 00000 |
| . | . | . | . | . | . | . | . | . |
| . | . | . | . | . | . | . | . | . |
| . | . | . | . | . | . | . | . | . |
| P. 1197 | NEGLIGI | 01110 | 00101 | 00111 | 01100 | 01001 | 00111 | 01001 |
| P. 1198 | NEITHER | 01110 | 00101 | 00111 | 10100 | 01000 | 00101 | 10010 |
| . | . | . | . | . | . | . | . | . |
| . | . | . | . | . | . | . | . | . |
| . | . | . | . | . | . | . | . | . |
| P. 2131 | ZYTHUMϕ | 11010 | 11001 | 10100 | 01000 | 10101 | 01101 | 00000 |

Between the words representing the pages and the desired word, there is a relation as follows:

AAA< . . . <NEGLIGI <NEIGHBO <NEITHER< . . . <ZYTHUM.

Through the comparing circuit 16 for comparing the value of the binary numbers, it is found that the page 1198 includes the desired word "neighbor".

In the dictionary used in the above-described embodiment, the binary code for 2132 pages requires 12 bits and the code for the word with seven letters requires 35 bits. Therefore, 47 bits (12 + 35) are required to give information for one word in the memory 10. There are 140,000 words in the dictionary. Except for the control information such as clock, command, start and the like, the total quantity of the information to be memorized in the memory becomes 47 × 140,000 = 6,600,000 bits.

However, in accordance with the method of the present invention, this quantity is reduced to 47 × 2,132 = 100,000 bits.

Further, the information of the pages can be eliminated by employing a counter for counting the information of the word representing the page, since the number of the pages is serial in the dictionary. Thus, the quantity of the information can be reduced to $35 \times 2,132 = 75,000$ bits. When a subsequent or prior page is projected onto the projection screen, a reversible counter is used for making the output indicative of the smaller or larger number of the page.

The above-described page representing word is not limited to the last word of the page, but may be any combination of letters to be arranged between the last word of the page and the first word of the next page. For instance, the word for representing the page 28 can be selected as follows: The last word of page 28 is NEGLIGIBLE and the first word of the next page 29 is NEGOTIABILITY. Among the combination of letters to be arranged between the two words, there are words of a smaller number of letters. By selecting such an imaginary word for representing the page, the number of letters and accordingly the quantity of information of the word can be reduced. In the above instance, there are a few words which are composed of four letters among the imaginary words to be arranged between the two words such as NEGM, NEGN. By appropriately selecting the words for representing the page as described hereinabove, the total number of letters, and accordingly the quantity of the information, can be reduced by 25 percent over the method in which the last word is selected as the representative word. Therefore, the number of bits is reduced to $75,000 \times ¾ = 56,000$ bits.

Thus, the quantity of the information is reduced to $(56,000 \times 100)/(6,600,000) = 0.8\%$ of the quantity of the information required in the prior art in accordance with the present invention.

Though in the above description of the present invention the recording medium of the page of the dictionary is a microfiche or other microfilm such as a rolled microfilm, other recording mediums bearing an optical image of the page can be employed.

The memory 10 for memorizing the information of the representative words is not necessarily an optical memory, but may be any other known memory such as a magnetic tape or magnetic core.

As apparent from the above detailed description of the present invention, the invention is applicable for any dictionary or encyclopedia in which the head words are orderly arranged, increasing or decreasing as the page increases.

What is claimed is:

1. A machine implemented method of retrieving a desired word from a dictionary comprising:

storing the words of the dictionary written in phonetical signs in alphabetical order in groups on a microfilm, each of said groups corresponding to a page in said dictionary, said microfilm being operably mounted in a microfilm display apparatus, designating each group by a numerical address, the numerical address of each group corresponding to the dictionary page number of the page corresponding to the group, designating each group by an imaginary representative word having a phonetical weight greater than that of the last word of the group and less than that of the first word of the next group, said imaginary word containing the minimum number of letters necessary to distinguish it from said last word and said first word, converting each of said imaginary representative words into an electrical code, each of said imaginary representative word codes having a numerical weight corresponding to the phonetical weight of the corresponding imaginary representative word, storing said representative word codes in a machine memory in a numerically increasing order, converting said desired word into an electrical code corresponding to the code of said imaginary representative words, successively comparing the desired word code with each representative word code until the numerical weight of the representative word code becomes greater than the numerical weight of the desired word code, generating an address signal corresponding to the address of the group of words represented by the first imaginary representative word code which has a numerical weight equal to or greater than the numerical weight of the desired word code determined during said successive comparison, and addressing said microfilm display apparatus with said address signal to display the addressed group of words.

2. The method of retrieving a desired word from a dictionary as set forth in claim 1, wherein said step of generating an address signal comprises storing in said machine memory for each of said representative word codes, the numerical address of the corresponding group of words, reading out the stored numerical address associated with the first representative word code having a numerical weight greater than the numerical weight of the desired word code determined during said successive comparing.

* * * * *